United States Patent

[11] 3,597,644

| [72] | Inventor | Kenneth Preece<br>Solihull, England |
|---|---|---|
| [21] | Appl. No. | 854,849 |
| [22] | Filed | Sept. 3, 1969 |
| [45] | Patented | Aug. 3, 1971 |
| [73] | Assignee | Joseph Lucas (Industries) Limited<br>Birmingham, England |
| [32] | Priority | Sept. 13, 1968, Jan. 14, 1969 |
| [33] | | Great Britain |
| [31] | | 43577/68 and 2193/69 |

[54] DYNAMO ELECTRIC MACHINES AND YOKE ASSEMBLIES THEREFORE
1 Claim, 8 Drawing Figs.

[52] U.S. Cl. .................................................. 310/40,
310/42, 310/218
[51] Int. Cl. ....................................................... H02k
[50] Field of Search .......................................... 310/40, 40
MM, 42, 216—18, 254, 258, 259

[56] References Cited
UNITED STATES PATENTS

| 2,764,802 | 10/1956 | Feiertag | 310/42 X |
| 3,449,606 | 6/1969 | Preece | 310/218 X |
| 2,890,357 | 6/1959 | Clark, Jr. | 310/258 |
| 3,156,838 | 11/1964 | Winther | 310/42 |
| 3,328,617 | 6/1967 | Preece | 310/180 |

Primary Examiner—Donovan F. Duggan
Attorney—Holman and Stern

ABSTRACT: In a dynamo electric machine, the poles of the machine are recessed on their outer faces and are contained within a casing which is deformed into the recesses to thicken the poles. Some of the poles have tags for receiving bolts holding in position an end bracket defining one bearing for the rotor assembly. The poles may be in two portions, with the two portions defining a space for receiving the stator winding of the dynamo electric machine.

PATENTED AUG 3 1971 3,597,644

SHEET 2 OF 4

INVENTOR
Kenneth Preece
BY
ATTORNEYS

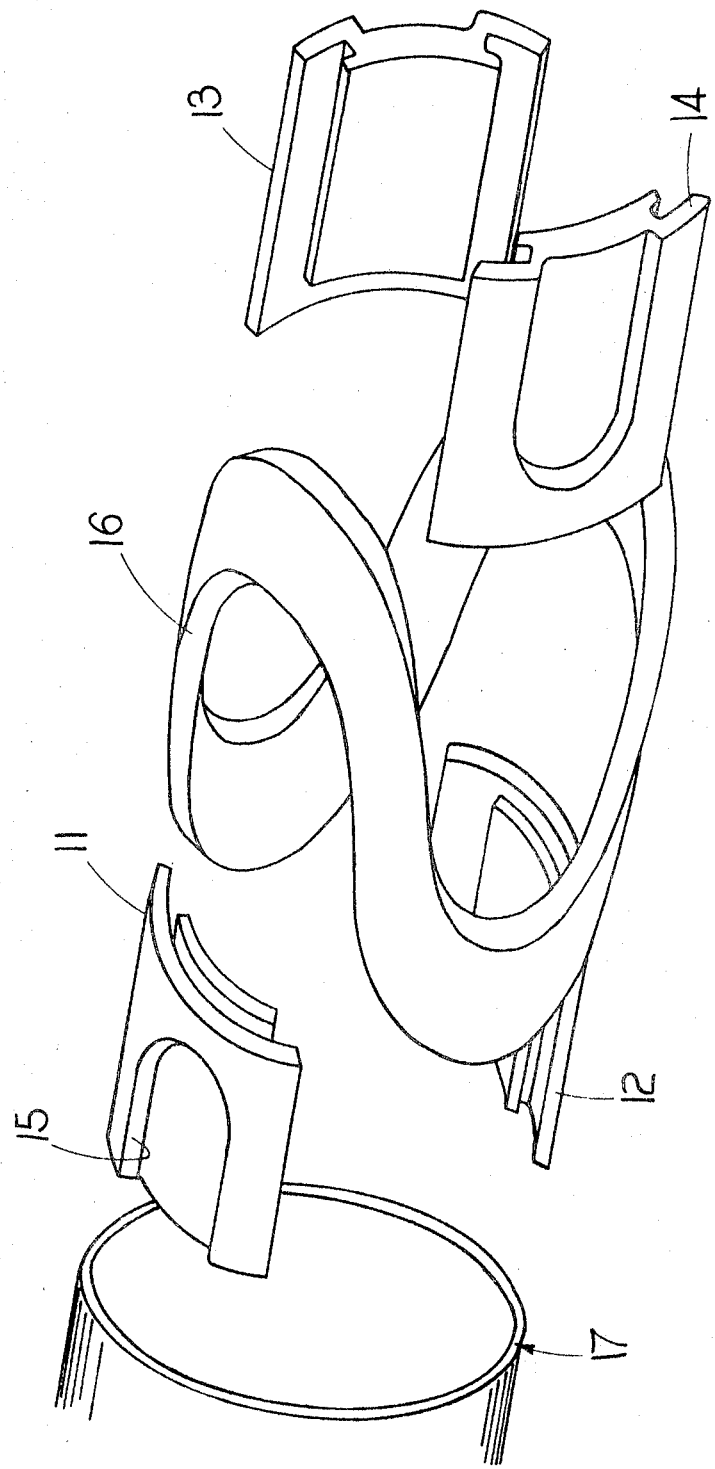

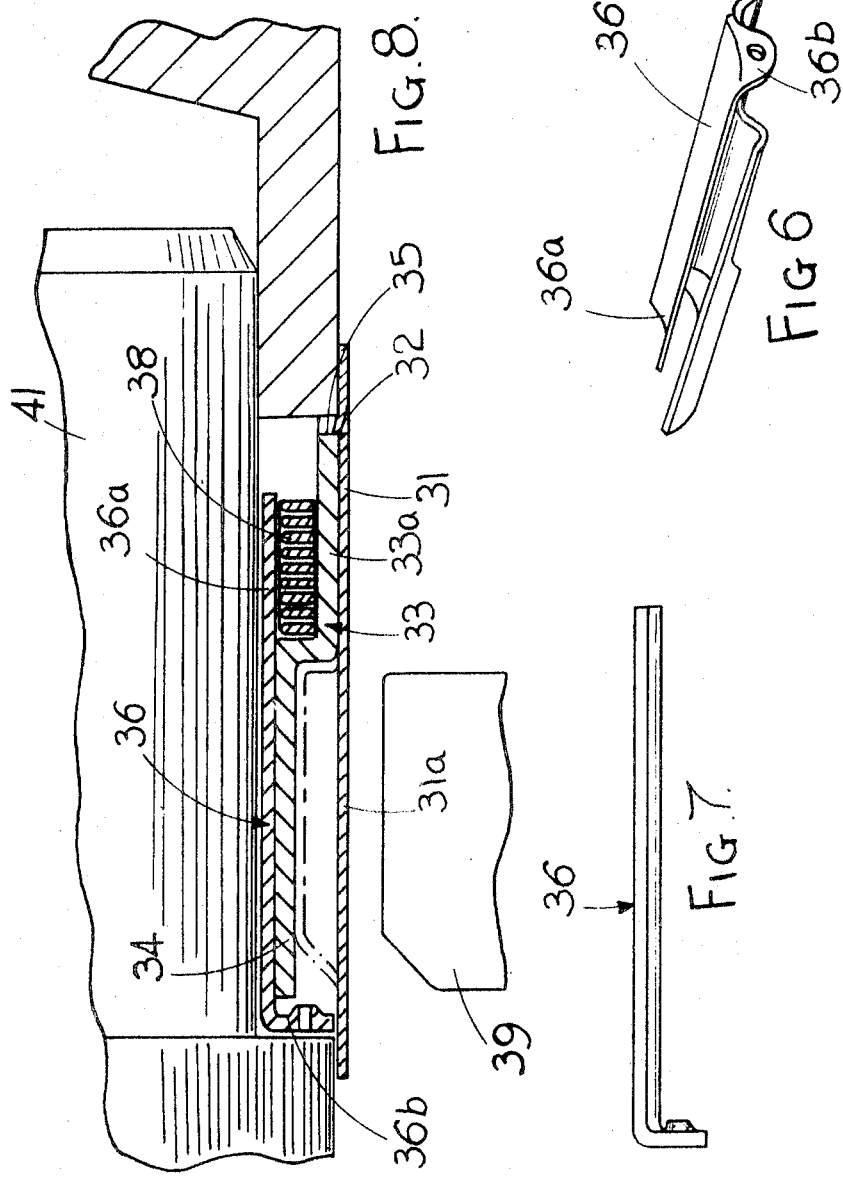

DYNAMO ELECTRIC MACHINES AND YOKE ASSEMBLIES THEREFORE

This invention relates to yoke assemblies for dynamo electric machines.

In one aspect, the invention resides in a yoke assembly comprising in combination a tubular sheet metal casing having a plurality of poles secured thereto, each pole being recessed on its outer surface and portions of the casing being deformed so as to lie in said recesses and so increase the thickness of the poles.

Figure 1:
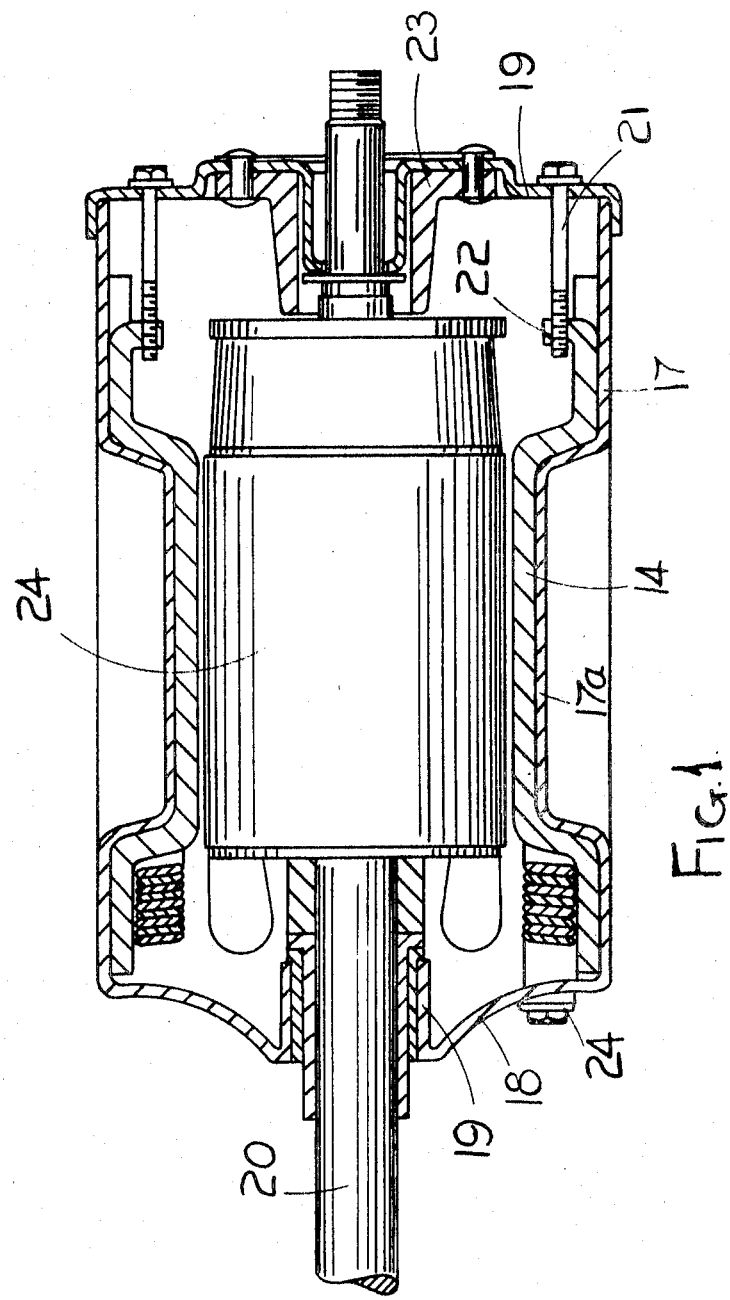
Figure 2:
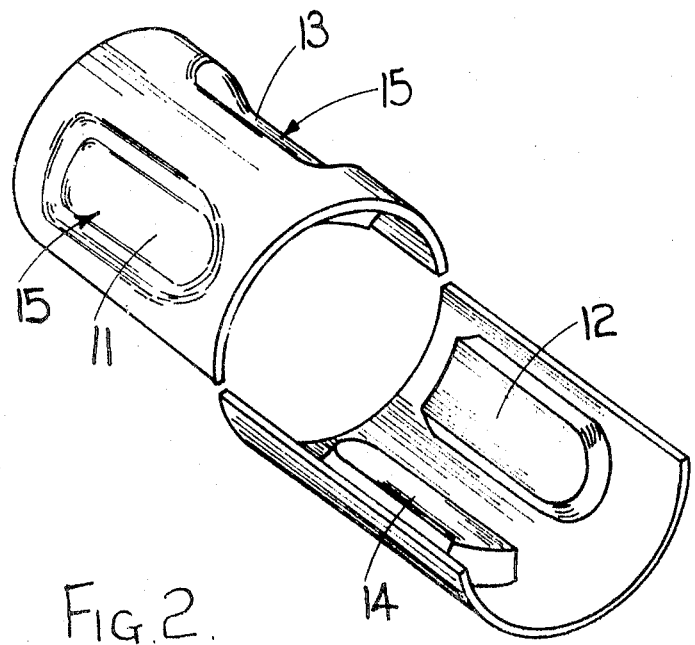
Figure 4:
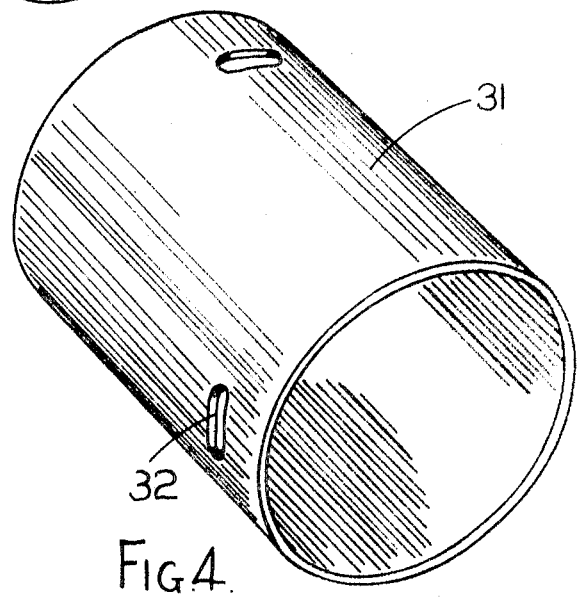
Figure 5:
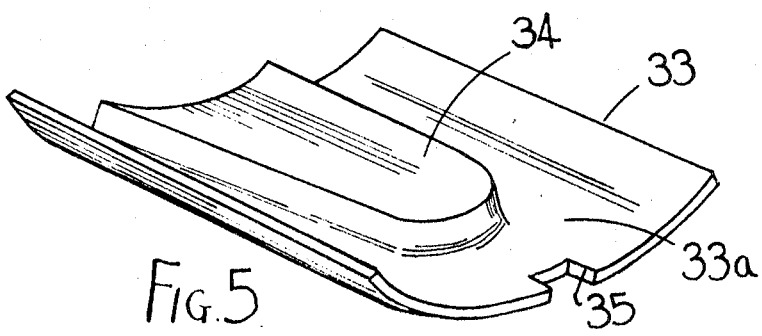

In another aspect, the invention resides in a yoke assembly comprising in combination a tubular sheet metal casing having a plurality of poles secured thereto, each pole comprising a first sheet metal part secured to the casing and shaped to the required pole form, and a second sheet metal part secured to the first part and shaped to define the face of the pole which is directed radially inwards, the second part having an extension defining with the first part a space in which a winding is trapped. In the accompanying drawings:

FIG. 1 is a sectional view illustrating one example of the invention,

FIG. 2 is an exploded perspective view of part of FIG. 1 showing the arrangement of poles, FIG. 3 is an exploded perspective view of a modification of the arrangement shown in FIG. 1, FIG. 4 is a perspective view of a tubular casing used in a second example, FIGS. 5 and 6 are perspective views of parts of a pole used in the second example, FIG. 7 is a side view of the pole part shown in FIG. 6 and FIG. 8 is a part-sectional view showing the components assembled.

Referring to FIGS. 1 and 2, the poles 11, 12, 13, 14 are stamped from two semicylindrical parts, the poles 12, 14 being on one part and the poles 11, 13 being on the other part. Each pole has a recess 15 in its outer surface, and is shaped to receive a wave-wound winding 16, that is to say a winding with axially extending portions joined by curved end portions. The assembly further includes a tubular sheet metal casing 17 which at one end is formed with an integral extension 18 defining part of a bearing 19 for the armature shaft 21 of a starter motor in which the yoke assembly is employed. The extension 18 could be separate from the casing 17 and secured thereto. At the end opposite the extension 18, a second end bracket 19 is secured to the casing 17 by bolts 21 which extend into tags 22 raised from the poles 13 and 14. The end bracket 19 defines another bearing for the shaft 21, and also supports a brush housing 23 which cooperates with a face-type commutator secured to the armature 24, it being appreciated that a barrel-type commutator could be utilized if desired.

In order to assemble the arrangement, the winding 16 is positioned on a mandrel and the poles are then placed in position, so that the two semicylindrical parts define a cylinder. The whole arrangement is then pressed into the casing 17, which at this point is cylindrical, and the tool is then used to deform portions 17a of the casing into the recesses 15 in the poles. The mandrel is then removed. Connections to the winding 16 are made in any convenient manner, one earth connection being indicated at 24 in FIG. 1. If necessary, any convenient means is provided for ensuring that the winding 16 cannot move. For example, spring clips could be used for this purpose.

It will be appreciated that although the assembly is formed from sheet metal the required thickness for the poles is obtained by virtue of the deformation of the parts 17a of the casing so that the parts 17a effectively become parts of the poles.

In the modification shown in FIG. 3 the four poles are separate and are formed by a casting or a powder metallurgy technique. The four separate poles include integral extensions which define spaces in which the winding 16 is located, and the arrangement is assembled in the manner described with reference to FIGS. 1 and 2.

Referring now to FIGS. 4 and 8, a sheet of metal is stamped to form four projections, assuming that a four pole machine is being manufactured, and is then rolled and seam welded to form a tubular casing 31 with inwardly directed projections 32 which are angularly spaced by 90°, alternate projections 32 being at opposite ends of the casing 31. The casing is designed to house a wave wound winding, that is to say a winding which has axially extending portions joined by curved end portions extending round the poles, alternate curved end portions being at opposite ends of the casing 31.

Each pole consists of two parts, the first of which is shown in FIG. 5, and comprises a sheet metal pressing 33 having a hollow pole form 34 upstanding therefrom, a part 33a of the pressing extending beyond the pole form 34 and being formed with a location notch 35. The other part of the pole is also a sheet metal pressing 36 shown in FIGS. 6 and 7, and is shaped complementarily to the pole form 34, but with an extension 36a at one end, and an inwardly extending lug 36b at the other end formed with a plunged hole.

Referring now to FIG. 8, it will be seen that the pressing 33 is located in position relative to the casing 31 by engagement of the projections 32 in the slots 35. The arrangement being such that the parts 33a, and 36a define between them a space in which the wave wound field winding 38 is located. The assembly is held in position by using a tool 39 in association with a mandrel 41 to force a portion 31a of the casing 31 into the hollow pole 34 as shown in dotted lines in FIG. 7 and then impregnating the assembly with varnish.

The plunged holes in the parts 36b are for holding bolts to secure the ends caps of the assembly in position.

In a modification, instead of using four parts 33, the poles 34 are pressed from a single sheet which is then rolled to cylindrical form. In a further modification the poles are pressed from two semicylindrical parts, two poles to each part, the two parts being interengaged to define a cylinder during assembly.

Having thus described my invention what I claim as new and desire to secure by Letters Patent is:

1. A dynamo electric machine comprising in combination a tubular sheet metal casing having a portion thereof defining a first bearing, a plurality of poles secured to said casing, each pole being recessed on its outer surface and portions of the casing being deformed so as to lie in said recesses and so increase the thickness of the poles, and end plate defining a second bearing, a rotor assembly supported by said bearings, integral tags on at least two of said poles, and securing means extending from said end plate into said tags to hold said end plate in position, each of said poles comprising a first sheet metal part secured to the casing and shaped to the required pole form and a second sheet metal part secured to the first part and shaped to define the face of the pole which is directed radially inwards, the second part having an extension defining with the first part a space in which a winding is located.